(12) United States Patent
Bech et al.

(10) Patent No.: US 9,366,233 B2
(45) Date of Patent: Jun. 14, 2016

(54) METHOD AND ARRANGEMENT FOR CONTROLLING AN OPERATION OF AN ELECTRIC ENERGY PRODUCTION FACILITY DURING A DISCONNECTION TO A UTILITY GRID

(75) Inventors: John Bech, Hammel (DK); Knud Dam Hageman Madsen, Galten (DK)

(73) Assignee: SIEMENES AKTIENGESELLSCHAFT, München (DE)

(*) Notice: Subject to any disclaimer, the term of this patent is extended or adjusted under 35 U.S.C. 154(b) by 657 days.

(21) Appl. No.: 13/409,143

(22) Filed: Mar. 1, 2012

(65) Prior Publication Data
US 2012/0242295 A1  Sep. 27, 2012

(30) Foreign Application Priority Data
Mar. 21, 2011 (EP) .................................. 11158992

(51) Int. Cl.
*H02J 1/00* (2006.01)
*F03D 9/00* (2016.01)
*H02J 3/18* (2006.01)
(Continued)

(52) U.S. Cl.
CPC . *F03D 9/003* (2013.01); *H02J 3/18* (2013.01); *H02J 3/386* (2013.01); *H02J 9/04* (2013.01); *F05B 2270/1074* (2013.01); *Y02B 10/72* (2013.01); *Y02E 10/725* (2013.01); *Y02E 10/763* (2013.01); *Y02E 10/766* (2013.01); *Y02E 40/30* (2013.01); *Y02P 80/22* (2015.11)

(58) Field of Classification Search
CPC ................. H02P 9/04; H02J 3/40; H02J 1/00; Y02E 40/30
USPC .............................................. 307/85; 322/87
See application file for complete search history.

(56) References Cited

U.S. PATENT DOCUMENTS

| | | | | |
|---|---|---|---|---|
| 5,311,418 A | * | 5/1994 | Lalander | H02M 3/315 307/82 |
| 5,390,068 A | * | 2/1995 | Schultz | H02P 9/04 307/87 |

(Continued)

FOREIGN PATENT DOCUMENTS

| | | |
|---|---|---|
| CN | 1470092 A | 1/2004 |
| CN | 101034807 A | 9/2007 |

(Continued)

OTHER PUBLICATIONS

De Zeeuw et al., "On the components of a wind turbine autonomous energy system", Proceedings of the International Conference on Electrical Machines, 1984, pp. 193-196, XP001031999.

(Continued)

*Primary Examiner* — Rexford Barnie
*Assistant Examiner* — Joseph Inge

(57) ABSTRACT

A method is provided for operating an electric energy production facility during a fault in a utility grid to which energy is to be delivered. The energy production facility includes at least one wind turbine. The method includes disconnecting the utility grid from the wind turbine. The method further includes connecting an external generator via a cable to an auxiliary equipment of the wind turbine, to deliver active power to the auxiliary equipment. The cable is connected to a converter of the wind turbine the converter supporting reactive power. A corresponding arrangement also provided.

13 Claims, 2 Drawing Sheets

(51) Int. Cl.
*H02J 3/38* (2006.01)
*H02J 9/04* (2006.01)

(56) References Cited

U.S. PATENT DOCUMENTS

| | | | | |
|---|---|---|---|---|
| 5,734,257 | A * | 3/1998 | Schauder | H02J 3/184 307/105 |
| 6,906,434 | B1 * | 6/2005 | Koeppe | H02J 3/185 307/103 |
| 2002/0087234 | A1 * | 7/2002 | Lof | F03D 7/0284 700/286 |
| 2002/0105231 | A1 * | 8/2002 | Koeppe | H02J 3/185 307/64 |
| 2004/0167677 | A1 * | 8/2004 | Weiss | G06Q 40/04 700/291 |
| 2005/0225090 | A1 * | 10/2005 | Wobben | F03D 9/00 290/44 |
| 2008/0150282 | A1 * | 6/2008 | Rebsdorf | F03D 7/0284 290/44 |
| 2009/0134625 | A1 * | 5/2009 | Altenschulte | F03D 11/00 290/44 |
| 2009/0206603 | A1 * | 8/2009 | Llorente Gonzalez | F03D 7/0224 290/44 |
| 2011/0025059 | A1 * | 2/2011 | Helle | F03D 9/02 290/44 |
| 2011/0134574 | A1 * | 6/2011 | Ritter | H02P 9/007 361/21 |
| 2012/0146423 | A1 * | 6/2012 | Bodewes | F03D 9/005 307/84 |

FOREIGN PATENT DOCUMENTS

| | | | |
|---|---|---|---|
| DE | 2643169 | B1 | 2/1978 |
| DE | 10020635 | A1 | 3/2001 |
| DE | 10320087 | A1 | 12/2004 |
| DE | 102005038558 | A1 | 2/2007 |
| EP | 1752659 | A2 | 2/2007 |
| EP | 2236821 | A1 * | 10/2010 |
| NL | EP 2236821 | A1 * | 10/2010 | ............ F03D 9/005 |
| WO | WO 0152379 | A2 | 7/2001 |
| WO | WO 0221661 | A1 | 3/2002 |
| WO | WO 02103879 | A1 | 12/2002 |

OTHER PUBLICATIONS

"Technical rule for connecting wind farm into power grid"; Chinese State Grid; cover pages and pp. 1-17; 2009; Dec. 22, 2009.

Leonhard W. et al; "Power Electronics and Control by Microelectronics in Future Energy Systems"; EPE Journal; vol. 10; No. 1; pp. 6-10 + 40-46;; Apr. 1, 2000.

Neufang O.; "Lexikon der Elektronik"; Friedr, Vieweg&Sohn, Braunschweig/Wiesbaden; pp. cover pages and p. 56; 1983, DE.

Machowski Jan et al; "Power System Dynamics and Stability"; John Wiley&Sons; cover pages and pp. 30-35; 1997.

Braun M.; "Reactive Power Supplied by Wind Energy Converters—Cost-Benefit-Analysts"; ewec 2008 Bruessel; pp. 1-10; 2008: DE.

Camm E. H.; "Reactive Power Compensation for Wind Power Plants"; Power&Energy Society General Meeting, PES 09, IEEE; pp. 1-7; US; Jul. 26, 2009.

Yangzan He et al; "Power System Analyse"; Huazhong University of Science and Technology Press; third edition, an educational textbook for Chinese academic studies: pp. 1-6; 2002; CN.

Nayeem Rahmat Ullah et al; "Variable Speed Wind Turbines for Power System Stability Enhancement"; Electric Power Engineering; pp. 1 -9; SE; Jul. 12, 2006.

Qijing Mao; "Compensating Reactive Power Loss of Wind Farm with Reactive Power Generated by Wind Turbine Generators"; China Academic Journal Electronic Publishing House: vol. 33; No. 19; pp. 175-180; 2009: CN.

Prabha Kundur; "Power System Stability and Control": McGraw-Hill: pp. cover pages and pp. 20-201 + 628-639; 1994.

Xi Xiao; "Effect of Synchronize and Close of Tongfa Wind Power Plant on Voltage of Baitao Grid"; China Academic Journal Electronic Publishing House; vol. 35; No. 4 (Ser. No. 191); pp. 38-41; 2007: CN.

Ning Yuanhong; "Black start of district power system and its strategy research"; Master Thesis, University of Guangxi; pp. cover pages and pp. 61-63; 2007; Jun. 26, 2007.

Da Rocha Barros Marques, Miguel Jorge; "Steady State Analysis of the Interconnection of Offshore Energy Parks"; Instituto Superior Tecnico—Universidade Tecnica de Lisboa; pp. cover pages and pp. 1-87; 2010; PT.

* cited by examiner

METHOD AND ARRANGEMENT FOR CONTROLLING AN OPERATION OF AN ELECTRIC ENERGY PRODUCTION FACILITY DURING A DISCONNECTION TO A UTILITY GRID

CROSS REFERENCE TO RELATED APPLICATIONS

This application claims priority of European Patent Office application No. 11158992.5 EP filed Mar. 21, 2011. All of the applications are incorporated by reference herein in their entirety.

FIELD OF INVENTION

The present invention relates to a method and to an arrangement for controlling an operation of an electric energy production facility comprising at least one wind turbine during a disconnection to a utility grid (e.g. due to a fault) to which energy had to be delivered.

ART BACKGROUND

During a fault of the utility grid, such as a short circuit or malfunction a wind farm comprising one or more wind turbines may be disconnected from the grid since they cannot supply their active power in a normal energy production state. This kind of disconnection between the utility grid and the wind farm may also be referred to as islanding. In case the wind turbines are disconnected from the utility grid they do not need to be operated in a normal energy production state in which they normally produce energy and supply the produced electric energy to the utility grid. Nevertheless, also in this case of islanding some auxiliary equipment of the wind turbines, such as yaw motors for yawing, control equipment and the like, may require electric energy for operation—due to safety reasons.

In a conventional system a diesel generator may be used to supply electric energy to the auxiliary equipment of the wind turbine.

However, it has been observed that operating the wind turbine in the non-production state, i.e. or for example in the case, where the utility grid is disconnected from the wind turbine, is difficult or causes problems.

There may be a need for a method and for an arrangement for controlling an operation of an electric energy production facility comprising at least one wind turbine during a disconnection in a utility grid, wherein auxiliary equipment of the wind turbine shall be supplied with electric energy in a reliable and cost-effective manner.

SUMMARY OF INVENTION

This need may be met by the subject matter according to the independent claims. Advantageous embodiments of the present invention are described by the dependent claims.

According to an embodiment, a method for operating an electric energy production facility (designed for generating electric energy to be supplied to an utility grid which distributes the electric energy to one or more consumers) comprising at least one wind turbine (in particular comprising a wind turbine tower, a nacelle mounted on top of the wind turbine tower, wherein the nacelle supports a rotor shaft to which one or more rotor blades are connected, wherein the rotor shaft is also connected to a generator (A gearbox may be connected between the rotor shaft and generator) to convert rotational energy into electric energy which is supplied to a full converter, transforming all the energy to collecting grid voltage and frequency) during a fault in a utility grid to which energy is to be delivered is provided.

Therein, the method comprises disconnecting (in particular using a switch, such as a power switch) the utility grid from the wind turbine; connecting (in particular using a switch, such as a power switch) an external generator (such as a combustion engine, in particular a diesel motor) via a cable (comprising at least two, in particular three, conductors for conducting electric current of at least two phases, in particular three phases, electric energy or an electric energy stream) to (in particular via a transformer) an auxiliary equipment (such as an actuator, for example a yawing actuator, a rotor blade pitch angle actuator, a controller, a measurement equipment or the like) of the wind turbine, to deliver active power (which may be obtained by forming a product of the current, the voltage and the cosine of the angle between the voltage and the current) to the auxiliary equipment, wherein the cable is connected via a transformer (for transforming a low voltage at the converter, such as 600 V to 800 V to a medium voltage, in particular between 5 kV and 50 kV, at the collector grid) to a converter (for converting a particularly variable frequency energy stream delivered by the generator of the wind turbine which is connected to the rotor shaft (maybe through a gear box) to a particularly fixed frequency, for example 50 Hz or 60 Hz, energy stream to be delivered to the utility grid) of the wind turbine, wherein the converter supports reactive power (which is to be defined as a product of the current, the voltage and the sine of the angle between the voltage and the current).

In particular, reactive power may be generated due to voltage being applied between at least two conductors of the cable, wherein in particular the cable may provide a particular distributed capacitance, resulting in a relative phase-shift between voltage and current flowing through or being applied to (different conductors of) the cable.

In particular, the reactive power evolving due to voltage being applied to the cable may be undesired and may cause problems, in particular when there is no utility grid connected to balance the reactive power. In particular, the reactive power generated in the cable (or one or more further cables) of the wind farm collector grid may be larger than the needed active power for operating the auxiliary equipment which may result in that the power factor (which may be defined as cosine of the angle φ between the voltage V and the current I) of the diesel power generation is less than 0.7 which in turn may require a relatively large diesel generator.

In particular, the power factor PF may also be defined as $$PF = \frac{P}{S} = \frac{P}{\sqrt{P^2 + Q^2}}$$

where:
PF is the power factor
P is the active power in W
S is the apparent power in VA
Q is the reactive power in VAr.

Thereby, in a conventional system, a very expensive diesel generator may be required. However, a diesel generator may be operated in a save and stable region only for particular values of the active power and the reactive power. In particular, a conventional diesel generator may be unstable above 0.2 pu (20%). Thereby, pu is also called per unit and it is defined as actual generated power divided by the nominal power of the generator. The nominal power of a generator is also denoted as base power. An example: If a generator with a nominal power of 1.0 MW is delivering 0.2 MW—then the per unit value is 0.2 MW/1.0 MW=0.2 pu—which again is 20% of nominal power.

According to an embodiment of the present invention the converter of the wind turbine consumes the reactive power generated by the cable connecting the external generator and the auxiliary equipment. In particular, the converter may be adapted to consume or absorb the reactive power by appropriately switching one or more power transistors comprised in the converter. In particular, the converter may comprise a first set of power transistors that convert a variable frequency alternating current (AC) energy stream, current or voltage received from the generator of the wind turbine which is connected to the rotor shaft to a substantially direct current (DC) energy signal, current or voltage which may also be referred to as a DC link. Further, the converter may comprise a second set of power transistors that are switched such that the substantially DC energy signal, voltage or current is converted into a substantially fixed frequency AC energy signal, voltage or current to be supplied to the utility grid. By appropriately switching the second set of power transistors the converter may absorb the reactive power generated by the voltage applied to the cable or which is generated due to the cable.

Further, a control system, such as a SCADA system may be needed to control the reactive power, enabling the generator to run in a stable manner, in particular to run in a stable operating region. The Siemens WebWPS SCADA system offers remote control and a variety of status views and useful reports from a standard internet web browser. The status views present information such as electrical and mechanical data, operation and fault status, meteorological data and grid station data. Further information can be taken from http://www.energy.siemens.com/hq/en/power-generation/renewables/wind-power/wind-turbines/swt-3-6-120.htm Further, according to an embodiment, the control method or operating method may also control the start-up of the external generator, such as a diesel generator, the control method or operating method may also control connection of cables, transformers and turbine grid converters.

According to an embodiment of the present invention, the operating method further comprises connecting the converter to the cable (in particular using a switch, such as a power switch) after connecting the external generator to the auxiliary equipment of the wind turbine. Thereby, the idle operation state of the wind turbine may be reached in a save manner. In particular, in a normal operation state (in which energy is produced and supplied to the grid) of the wind turbine the converter may continuously be connected to the utility grid to provide the fixed frequency energy stream to the utility grid. Thus, in particular, upon occurrence of a fault in the utility grid, the converter may quickly be disconnected from the grid using a switch between the cable and the converter. Then, according to an embodiment, the converter may only be reconnected to the cable after connecting the external generator to the auxiliary equipment of the wind turbine, wherein this connecting the external generator comprises connecting the cable to the external generator.

According to an embodiment, the method further comprises applying a voltage between at least two conductors of the cable by the external generator to supply energy to the auxiliary equipment, thereby generating reactive power, wherein in particular the cable introduces a particular distributed capacitance leading to a phase-shift between voltage and current, thus generating reactive power.

According to an embodiment of the present invention, the operating method further comprises absorbing (or consuming) the generated reactive power by the converter connected to the cable. Thereby, the absorbing or consuming of the generated reactive power may comprise appropriately switching one or more power transistors comprised in the converter. Thereby, absorption of generated reactive power by the external generator may be reduced, thus also enabling reduction of a size and thus costs of the external generator. This additionally enables a safe operation of the external generator.

According to an embodiment of the present invention, the operating method further comprises connecting the external generator via a further cable (or one or more further cables) to a further auxiliary equipment (or one or more further auxiliary equipment) of a further wind turbine (or one or more further wind turbines) comprised in the electric energy production facility; and connecting a further converter (or one or more further converters) of the further wind turbine to the further cable after connecting the external generator to the further auxiliary equipment of the further wind turbine, wherein the further converter (or the one or more further converters) supports reactive power. Thereby, an electric energy production facility comprising a large number of wind turbines may be operated according to an embodiment during a disconnection situation of the utility grid.

In particular, performing the connections and disconnections relating to the individual wind turbines may be performed successively.

According to an embodiment, the operating method further comprises operating the external generator in an operation range or operation region (which may for example be characterized by an area or a region defined by points of voltage and current or by points defining reactive power (Q) and active power (P), such as a P-Q diagram) at which the external generator produces more active power than reactive power. Thus, the external generator does not need to support an extensive amount of reactive power, thereby simplifying the external generator and reducing the costs of the external generator and at the same time enables a more safe operation of the external generator.

According to an embodiment, in the operating region, the external generator produces at least 2 times, in particular at least 10 times, as much active power as reactive power. Thus, the external generator may exclusively be adapted for supplying the auxiliary equipment with electric energy, thus not requiring that the external generator is configured to consume the reactive power generated by the cable.

According to an embodiment, in the operation region of the external generator an amount of the reactive power is less than a threshold. In particular, the threshold may amount to 0.3 per unit kVAR. Thereby, the external generator may be operated in a stable operation region, in order to improve the reliability of the method and also to increase the durability of the external generator.

According to an embodiment of the invention, an amount of the active power delivered to the auxiliary equipment is less than, in particular less than two times, an amount of the reactive power generated by the cable. Thus, the method may in particular be applied, when the cable results in a large amount of reactive power, thereby extending the application range of the operating method.

According to an embodiment, an amount of the reactive power absorbed by the external generator is less than, in particular less than two times, an amount of the reactive power generated by the cable. Thereby, the external generator does not need to support a high amount of reactive power, thus simplifying the external generator, in particular enabling sizing down the external generator.

According to an embodiment of the present invention, an amount of the reactive power absorbed by the converter is at least 80%, in particular at least 90%, of an amount of the reactive power generated by the cable. Thus, most or in particular essentially all of the reactive power generated by the cable is consumed or absorbed by the converter. Thereby, the external generator is not required to absorb the reactive power.

It should be understood that any features (individually or in any combination) disclosed, described, employed or applied to a method for operating an electric energy production facility may also (individually or in any combination) applied, used for or employed to an arrangement for controlling an operation of an electric energy production facility according to an embodiment of the invention and vice versa.

According to an embodiment, it is provided an arrangement for controlling an operation of an electric energy production facility comprising at least one wind turbine during a disconnection to utility grid to which energy is to be delivered, the arrangement comprising a switch for disconnecting the utility grid from the wind turbine; and a switch for connecting an external generator via a cable and via a transformer to an auxiliary equipment of the wind turbine, to deliver active power to the auxiliary equipment; wherein the cable is connected to a converter of the wind turbine, the converter supporting reactive power.

According to an embodiment, the arrangement further comprises the external generator (for example a diesel generator) which is adapted to supply active power to the auxiliary equipment. In particular, the diesel generator may be a very reliable generator which however may not support reactive power or which may be configured to operate in an operation range in which primarily active power is generated, but wherein much less reactive power is generated or consumed. The external generator may apply a voltage between two conductors of the cable, thereby generating undesired reactive power.

According to an embodiment of the invention, the converter is adapted to consume reactive power generated by application of a voltage to the cable. Thereby, it may be easier and more cost-effective to consume the reactive power using the converter instead of using the external generator or installing other compensation equipments—such as for example shunt reactors.

According to an embodiment, a wind turbine is provided, which comprises the arrangement according to an embodiment, as described above.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments of the present invention are now described with reference to the accompanying drawings. The invention is not limited to the described or illustrated embodiments.

DETAILED DESCRIPTION OF INVENTION

Figure 1:
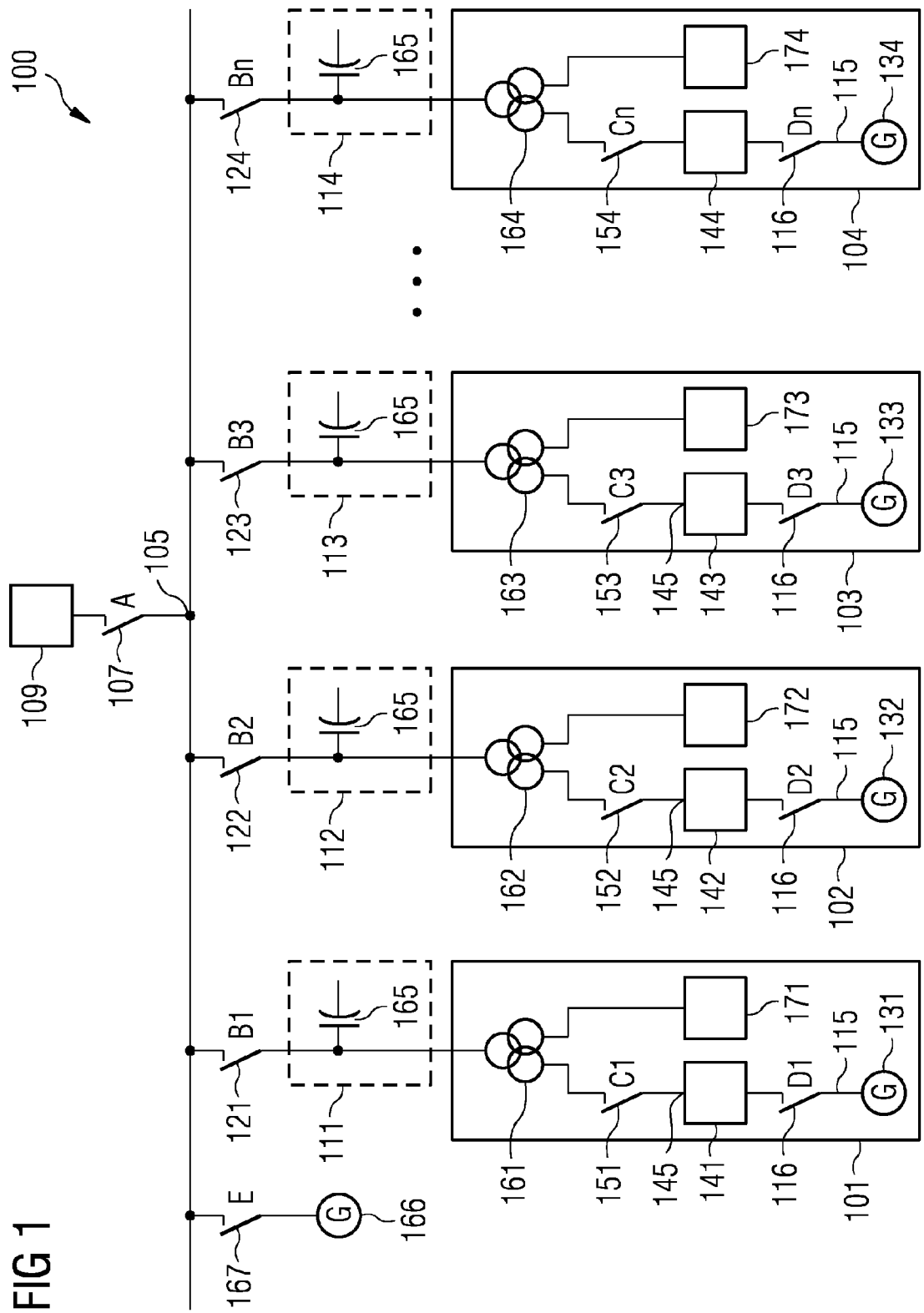
FIG. 1 schematically illustrates an electric energy production facility according to an embodiment of the invention.

The illustration in the drawings is in schematic form.

FIG. 1 schematically illustrates an electric energy production facility 100 according to an embodiment, comprising wind turbines 101, 102, 103 and a number of other wind turbines as symbolized by reference sign 104. Each wind turbine 101, 102, 103, 104 is connected via a respective cable 111, 112, 113, 114 and via a respective switch 121, 122, 123, 124 to a point of common connection 105 which connects via a switch 107 to a utility grid 109. Between the grid 109 and the point 105 one or more transformers may be arranged to transform a voltage supplied by the wind turbines to a higher voltage.

As is illustrated in the Table 1 below in a normal operation condition, wherein the wind turbines 101, 102, 103 and 104 deliver electric energy via the point of common connection 105 to the utility grid 109, the switch 107 is closed and the switches 121, 122, 123, 124 are also closed.

TABLE 1

| Operation mode Switch position | Normal operation state (grid 109 connected) | Fault operation state (grid 109 disconnected) |
|---|---|---|
| A (107) | Closed | Open |
| B (121-124) | Closed | Close one by one*) |
| C (151-154) | Closed | Close one by one*) |
| D (116) | Closed | Open |
| E (167) | Open | Closed*) |

Thereby the sequence of operations/switching may comprise:
1. Detect that grid is disconnected due to some fault on the grid
2. A switch opens
3. All B switches open
4. Diesel generator starts up
5. When diesel generator is in operation—E switch is closed
6. B1 switch close and the cable is energized by reactive power and the auxiliary equipment in wind turbine number 1 is supplied with active power from the diesel generator
7. C1 close and the converter in wind turbine 1 is now energizing the cable by reactive power (this may be the key point according to an embodiment of the invention)
8. The diesel generator does not supply reactive power to the cable anymore
9. The points 6 to 8 are repeated for the next wind turbines—one by one 10. When utility grid voltage comes back—switch A is switched in—when the voltages on the collector grid in wind farm is synchronized to the utility grid voltage 11. Diesel generator disconnects Each of the wind turbines 101, 102, 103, 104 comprises a respective generator 131, 132, 133, 134 which delivers via a power line 115 and via a switch 116 electric energy to a respective converter 141, 142, 143, 144. Each of the converters 141, 142, 143, 144 convert a generally variable frequency energy stream delivered from the generators 131, 132, 133, 134 to a fixed frequency energy stream supplied to a respective output terminal 145. The fixed frequency energy stream supplied to the output terminal 145 is supplied via a respective switch 151, 152, 153, 154 to a respective transformer 161, 162, 163, 164, the wind turbine three winding transformers. Typically one of the windings is connected to the collector grid (10-36 kV) at point 105, another winding is connected to the full converter 171-174 (typical 690V) and the last winding is connected to the auxiliary equipment 171 to 174 (400/230V)). Thereby it is enabled to supply the fixed frequency energy stream having a high voltage via the cables 111, 112, 113, 114 to the utility grid 109.

Thereby, during a normal operation state or operation condition of the electric energy production facility 100 the switches 151, 152, 153 and 154 are closed as indicated in Table 1.

The cables 111, 112, 113, 114 comprise a capacitance or a capacitor 165 which may result in generation of reactive power.

During a fault condition in the utility grid 109 it may be necessary to disconnect the grid 109 from the electric energy production facility 100. Thereby, in particular the main switch 107 will be opened (compare Table 1). Further, all switches connecting the wind turbines 101, 102, 103, 104 to the point of common connection 105, i.e. the switches 121, 122, 123, 124 will be opened.

After that, the external generator, here a diesel generator 166 may be started up. As soon as the diesel generator 166 is in operation the switch 167 may be closed. After that, the switch 121 connecting the first wind turbine 101 to the point of common connection 105 is closed and active power generated by the diesel generator 166 flows through the cable 111, thereby generating reactive power. The active power flowing through the cable is supplied to the auxiliary equipment 171 of the first wind turbine 101. The reactive power, or at least a portion of the reactive power generated due to the cable 111 is fed to the converter 141 by closing the switch 151. Thereby, the converter 141 consumes the reactive power generated due to flow of energy through the cable 111. Thereby, the diesel generator 166 may be designed for moderate nominal capability. In particular, the diesel generator 166 does not need to support reactive power.

Figure 2:
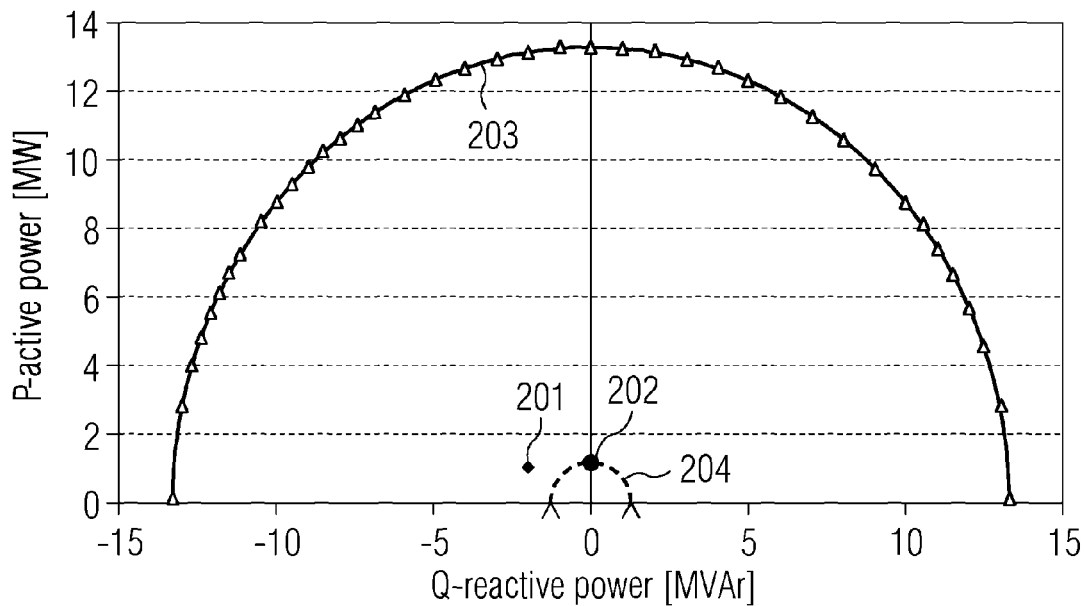
FIG. 2 depicts a graph illustrating an operational condition of external generators.

FIG. 2 depicts a graph, wherein on its abscissa the reactive power Q is indicated (in units MVAr), while on the ordinate the active power P is indicated (in units MW). In particular, FIG. 2 illustrates the electrical properties of the diesel generator 166 illustrated in FIG. 1. The operating point of a conventional diesel generator is indicated by reference sign 201, while the operating point of the diesel generator 166 used in the embodiment of the electric energy production facility is indicated or labelled by reference sign 202. In particular, the operating point of the diesel generator 166 used according to an embodiment in the electric energy production facility 100 illustrated in FIG. 1 has zero reactive power and 1 MW active power. The operating point 201 of the conventionally used external generator in contrast has a reactive power of −2 MVAr.

Further, the size (in terms of electrical properties) of the generator 166 as used according to an embodiment of the present invention is indicated by reference sign 204, while a size (in terms of electrical properties) of a conventionally used external generator is labelled by reference sign 203. As can be taken from FIG. 2, the size 204 of the generator 166 as used according to an embodiment of the present invention is much smaller than the size 203 of the conventionally used external generator. Thereby, using the generator 166 having the size 204 may reduce the costs of the electric energy production facility 100 compared to a conventional production facility.

Figure 3:
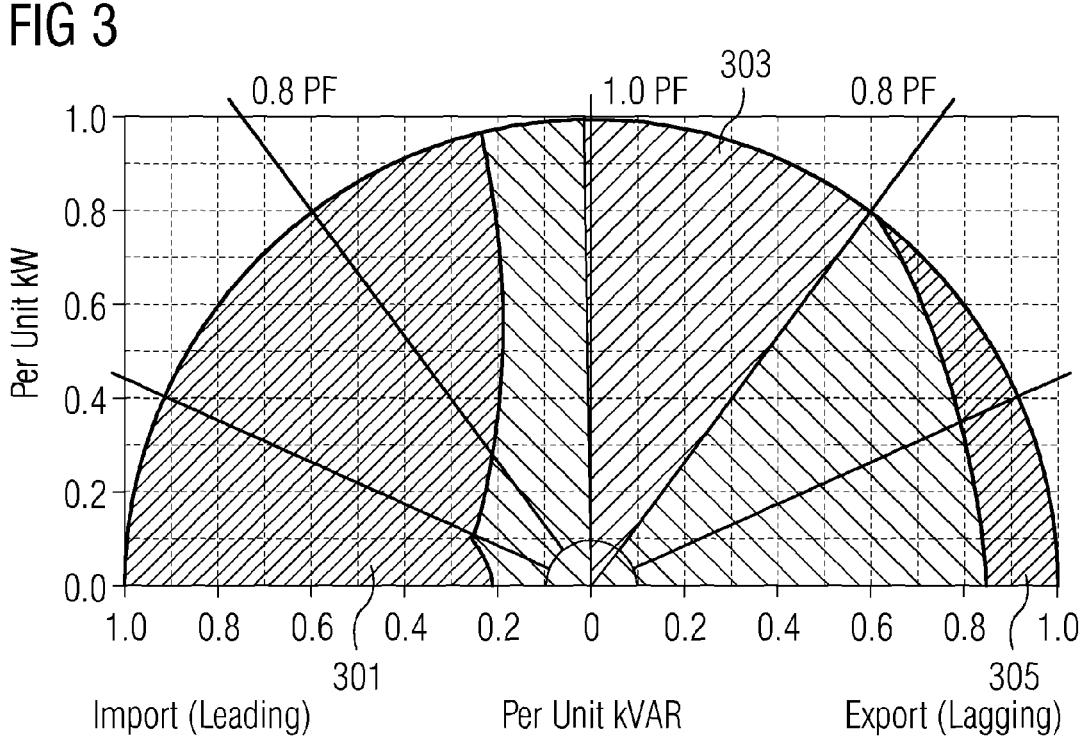
FIG. 3 illustrates a graph of a power capability curve for explaining an operational range of an external generator as used in a method or an arrangement for controlling an operation of an electric energy production facility according to an embodiment of the invention.

FIG. 3 illustrates a steady state alternator power capability curve, wherein a reactive power is indicated on the abscissa, while the active power is indicated on the ordinate. A region 301 represents an unstable voltage region, a region 303 represents an acceptable steady state operating region and a region 305 represents a rotor overheating region. FIG. 3 represents a typical alternator curve of reactive (kVAR) capability. As can be observed from FIG. 3, when the reactive power is above 0.2 per unit the external generator would operate in an unstable voltage region 301. This must be avoided. By using the converters 141, 142, 143, 144 for consuming the reactive power the external generator 166 may be operated in an acceptable operating region 303.

According to an embodiment the following may apply:

The diesel generator normal operation point is 1 MW active power and −2 MVAr reactive power and for the generator not to operate in the unstable voltage region—the reactive power may not be less than −0.15 pu. This result in a diesel generator sizing of (−2 MVAr)/(−0.15 pu)=13.3 MVA. This is shown as the yellow curve in the figure above.

The diesel generator invention operation point is 1 MW active power and 0 MVAr reactive power and thereby the generator can operate in "Acceptable Steady State Region". The size of the generator based on the invention is shown as the cyan curve in the figure above The sizing ratio between the two diesel generators (curves 203 and 204) are about 13 times—which will result in a considerable cost reduction. This may be the commercial value of the invention.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for operating an electric energy production facility comprising at least one wind turbine during a fault in a utility grid to which energy is to be delivered, the method comprising:

disconnecting the utility grid from the wind turbine,
connecting an external generator via a cable to an auxiliary equipment of the wind turbine, to deliver active power to the auxiliary equipment,
wherein the cable is connected via a transformer to a converter of the wind turbine,
wherein the converter supports reactive power,
arranging at least two conductors of the cable to introduce a distributed capacitance to the cable,
applying a voltage between said at least two conductors of the cable by the external generator to supply energy to the auxiliary equipment, the applying of the voltage between said at least two conductors of the cable at least in part effective to generate reactive power based on the introduced distributed capacitance to the cable;

when the generated reactive power is larger than an amount of reactive power to be consumed by the auxiliary equipment, absorbing, by the converter connected to the cable, at least a portion of the generated reactive power, effectively reducing an amount of reactive power absorbed by the external generator; and applying to one or more power transistors of the converter switching signals configured to permit the converter the absorbing of said at least portion of the generated reactive power.

2. The method according to claim 1, further comprising connecting the converter to the cable after connecting the external generator to the auxiliary equipment of the wind turbine.

3. The method according to claim 1, further comprising:
connecting the external generator via a further cable to a further auxiliary equipment of a further wind turbine comprised in the electric energy production facility, and
connecting a further converter of the further wind turbine to the further cable after connecting the external generator to the further auxiliary equipment of the further wind turbine, wherein the further converter supports reactive power.

4. The method according to claim 1, further comprising operating the external generator in an operation region at which the external generator produces more active power than reactive power.

5. The method according to claim 4, wherein in the operating region the external generator produces at least 2 times as much active power as reactive power.

6. The method according to claim 5, wherein in the operating region the external generator produces 10 as much active power as reactive power.

7. The method according to claim 4, wherein in the operation region an amount of the reactive power is less than a threshold.

8. The method according to claim 1, wherein an amount of the active energy delivered to the auxiliary equipment is less than an amount of the reactive power generated by the cable.

9. The method according to claim 1, wherein the amount of the reactive power absorbed by the external generator is less than an amount of the reactive power generated by the cable.

10. The method according to claim 1, wherein an amount of the reactive power absorbed by the converter is at least 80% of an amount of the reactive power generated by the cable.

11. The method according to claim 10, wherein an amount of the reactive power absorbed by the converter is at least 90% of an amount of the reactive power generated by the cable.

12. An arrangement for controlling an operation of an electric energy production facility comprising at least one wind turbine during a disconnection of a utility grid to which energy is to be delivered, the arrangement comprising:
a switch for disconnecting the utility grid from the wind turbine, and
a switch for connecting an external generator via a cable and via a transformer to an auxiliary equipment of the wind turbine, to deliver active power to the auxiliary equipment,
a converter adapted to consume reactive power, wherein the cable is connected to the converter of the wind turbine, the converter supporting reactive power,
wherein at least two conductors of the cable are arranged to introduce a distributed capacitance to the cable,
wherein, when a voltage is applied between said at least two conductors of the cable by the external generator to supply energy to the auxiliary equipment, reactive power is generated based on the introduced distributed capacitance to the cable;
wherein, when the generated reactive power is larger than an amount of reactive power to be consumed by the auxiliary equipment, the converter connected to the cable absorbs at least a portion of the generated reactive power, effectively reducing an amount of reactive power absorbed by the external generator,
wherein the converter comprises one or more power transistors responsive to switching signals configured to permit the converter to absorb said at least portion of the generated reactive power.

13. The arrangement according to claim 12, further comprising the external generator which is adapted to supply active power to the auxiliary equipment.

* * * * *